TRANSISTOR MODULATOR-AMPLIFIER
Filed Sept. 19, 1961
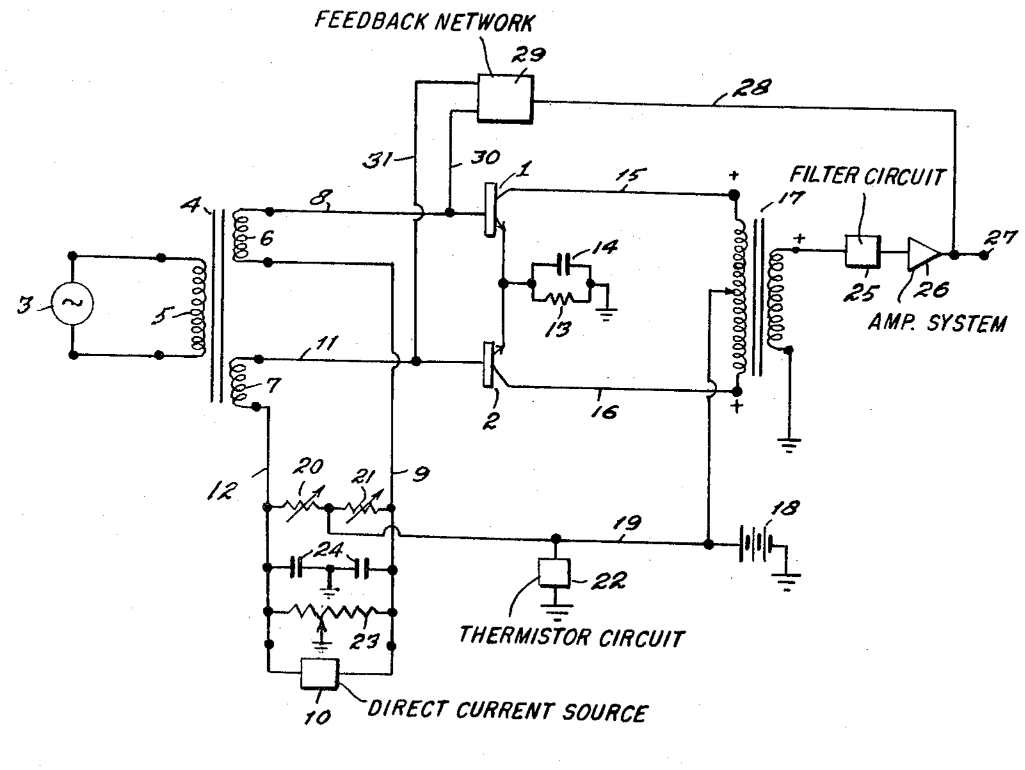
INVENTORS
Toivo A. Somer
BY Thomas L. Francis
S. J. Rotondi, A. J. Dupont & J. B. Reece, III

United States Patent Office 3,305,796
Patented Feb. 21, 1967

3,305,796
TRANSISTOR MODULATOR-AMPLIFIER

Toivo A. Somer, Detroit, Mich., and Thomas L. Francis, Dallas, Tex., assignors, by mesne assignments, to the United States of America as represented by the Secretary of the Army Filed Sept. 19, 1961, Ser. No. 139,318
2 Claims. (Cl. 332—44)

This invention relates to transistor circuits and more specifically to transistor modulator-amplifier circuits for converting low level direct current signals into alternating current signals.

In many circuits, it is desirable to have stable direct current amplifiers having high gain and low zero signal noises. This is particularly true in power supply circuits where direct current amplifiers are used as part of a voltage regulator system. The so called "chopper" type direct current amplifiers, in which the alternating current output is rectified and converted back to direct current, usually involves a mechanical vibrator or other complex switching means which has proven unsatisfactory where prolonged continuous operation with a minimum of maintainance is desirable.

It is therefore an object of the present invention to provide a circuit for converting low level direct current signals into alternating current signals.

Another object of this invention is to provide a simple circuit which exhibits very low zero signal noise and which has a linear output.

Yet another object of this invention is to provide a circuit in which the phase of the output signal is dependent upon the polarity of the direct current signal applied to the input terminals of the circuit.

Another feature of this invention is to provide a circuit in which a direct current signal is converted to a sinusoidal output signal.

Further objects and features, and the attending advantages of this invention will be apparent from a consideration of the following description when taken in connection with the accompanying drawing which is a schematic diagram of a system utilizing our invention.

Referring more particularly to the drawing, there is shown therein a modulator-amplifier circuit constructed in accordance with this invention. The modulator-amplifier includes two transistors 1 and 2 in a push-pull common emitter circuital arrangement. A constant signal source 3, which may be any desired frequency but is preferably 400 c.p.s., is coupled to the transistors through a transformer 4. The transformer has a primary winding 5 and two secondary windings 6 and 7. The secondary windings have one set of terminals connected through conductors 8 and 11 to the base electrodes of transistors 1 and 2 respectively while the other terminals of the windings are connected through conductors 9 and 12 to a source of fixed or slowly varying direct current 10. The emitters of transistors 1 and 2 are connected to ground through a common biasing resistor 13 which is bypassed by the condenser 14 for high frequencies. The collectors of the transistors 1 and 2 are connected through conductors 15 and 16, respectively, to the end terminals of a center tapped output transformer 17. The power source 18 is connected between ground and the center tap of the output transformer thereby applying the necessary operating power to the collectors.

In the operation of the circuit, the magnitude of the emitter-to-base biasing potential fixes the average emitter voltage, and this in turn fixes the average emitter current. The transistors 1 and 2 have a biasing potential from source 18 applied to their base electrode through the secondary transformer windings 6 and 7, variable biasing resistors 20, 21 and conductor 19. Connected across the power source 18 is a stabilizing thermistor network 22 which compensates for any external temperature changes which otherwise might adversely affect the operation of the circuit. The variable biasing resistors 20 and 21 may be varied if it is desired to change the quiescent region of operation of either of the transistors.

Since the direct current source 10 is connected through the secondary of the transformer 4 to the base electrodes of the transistors, any variation in source 10 will affect the biasing potential of the transistors. For completely balancing the input signals from the direct current source, a bridge circuit is provided across source 10. This bridge circuit includes a variable resistor 23 having is fixed terminals connected between the conductors 9 and 12, with the movable tap thereon being connected to ground. By proper adjustment of the movable tap, accurate balancing of the direct current input applied to the circuit may be obtained. High frequency filter capacitors 24 are also shown connected across the input conductors 9 and 12.

The output from the modulator-amplifier circuit is taken from the secondary winding of output transformer 17. The output from the secondary winding is connected to a filter circuit 25, to be described in greater detail hereinafter. The output from the filter 25 is fed to any desired amplifier system 26 having an output terminal 27. Feedback from the output of the amplifier 26, to the transistors 1 and 2 by means of conductor 28 and the feedback network 29, is provided to further stabilize the circuit against undesired changes due to temperature variations. This feedback is applied directly to the base electrodes of the transistors 1 and 2 by conductors 30 and 31, respectively.

In the operation of the modulator-amplifier the input signals from source 3 are applied in phase, through the transformer 4, to the base electrodes of the transistors 1 and 2. The biasing of the transistors is adjusted, with the input source 10 at some constant value, by varying the bias resistors 20 and 21 and by adjusting resistor 23 so that the output signal appearing on the collectors of the transistors are of equal amplitude. These in phase signals taken from the collectors of the transistor are applied to the end terminals of the center tapped output transformer 17. Since the signals applied to each end terminal of the transformer 17 are in phase and of equal amplitude, the combined or "added" output signal appearing on the secondary winding will be balanced out or zero in amplitude. Thus, as long as the potential value of source 10 does not vary, thereby unbalancing the circuit, there will be no output from transformer 17.

When the signal from source 10 varies from its initially adjusted value, there will be an unbalancing or change in the bias voltage applied to the base electrodes of the transistors. This shift in bias value causes one transistor to shift to a higher gain region and the other transistor to a lower gain region. This shift in turn causes the amplified alternating signal from source 3, appearing on the collector elements, to be of different magnitudes. Thus, the output signal present in the secondary winding of the transformer 17 will no longer be zero but will be a value equal to the combined or added signals applied to the end terminals of the transformer. As the voltage from source 10 continues to vary, the bias applied to the transistors will also continue to vary thereby causing an alternating current to be produced that is proportional to the variation of the signal from source 10. It may also be seen that, should there be a reversal in polarity of the signal source 10, there will be a shift of 180 degrees in the output signal with respect to the original output signal.

Due to the nature of the circuit, the alternating current output signal appearing at the secondary of the transformer 17 will not be sinusoidal. However, if a sinusoidal output is desired, it can be obtained by using a proper filtering system 25. Such systems are usually of the resistor-capacitor type and are well known in the art.

It can be seen that the modulator-amplifier circuit may be provided in several forms which render it suitable for various different applications. As previously stated, it is particularly applicable in systems wherein the direct current signal is of the fixed or slowly varying type. In addition to the applications of the system to power supplies as has been mentioned, the circuit may also be used in many other applications. For example, it may be utilized in modulator-amplifier systems for radio transmitters.

Although a specific embodiment of the invention has been disclosed, is is obvious that various changes and modifications can be made in the circuit within the intended scope of the invention as defined in the appended claims.

We claim:

1. A modulator amplifier circuit comprising:

(a) first and second transistors, said first and second transistors each having an emitter, collector and base electrode;

(b) a first source of alternating signals;

(c) an input transformer having a primary winding and first and second secondary windings, each of said windings having two terminals, said first and second secondary windings being wound to produce an in phase signal at one terminal thereof when the first source of alternating signal is connected to said input transformer primary winding;

(d) means connecting said first source of alternating signal to said input transformer primary winding;

(e) conductor means connecting said one terminals of the first and second secondary windings to the base electrodes of said first and second transistors respectively;

(f) biasing means, said biasing means being adjustable to provide for independent variation of each of said first and second transistors in the quiescent range of operation thereof;

(g) conductor means connecting said biasing means to the other terminals of the first and second secondary windings;

(h) an output transformer having a primary and a secondary winding, said primary winding being of the center tap type;

(i) conductor means connecting outputs from the collector electrodes of said first and second transistors to the ends of the output transformer primary winding;

(j) a power supply means connected to the center tap of said output transformer primary winding, said power supply means including a stabilizing thermistor network connected thereto to prevent undesired variations in the circuit due to external temperature variations;

(k) means for connecting the emitter electrodes of said first and second transistors to a common ground;

(l) a second source of signals connected directly to said biasing means, wherein any variation in said second source of signal varies the output appearing in the output transformer secondary winding; and (m) a feedback circuit connected between said output transformer secondary winding and said base electrodes of the first and second transistors, wherein a portion of said output is fed back to said base electrodes.

2. A modulator-amplifier circuit as defined in claim 1 wherein a filter network is connected between the output of the secondary winding of the output transformer and the feedback circuit to assure that a sinusoidal signal is fed back to the base of the transistors.

References Cited by the Examiner

UNITED STATES PATENTS

| | | | |
|---|---|---|---|
| 2,504,469 | 4/1950 | Tillman | 332—44 |
| 2,774,878 | 12/1956 | Jensen | 330—15 |
| 2,862,171 | 11/1958 | Freeborn | 332—31 |
| 2,972,114 | 2/1961 | Silverbach | 330—15 |
| 3,027,522 | 3/1962 | Boxall et al. | 332—44 |

ROY LAKE, *Primary Examiner.*

ROBERT H. ROSE, *Examiner.*

W. J. BETHURUM, A. L. BRODY, *Assistant Examiners.*